(12) United States Patent
Lee et al.

(10) Patent No.: US 7,113,475 B2
(45) Date of Patent: Sep. 26, 2006

(54) OPTICAL INFORMATION STORAGE MEDIUM AND RECORDING/REPRODUCING METHOD FOR THE OPTICAL INFORMATION STORAGE MEDIUM

(75) Inventors: Kyung-geun Lee, Gyeonggi-do (KR); Jung-wan Ko, Gyeonggi-do (KR); In-sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 10/437,444

(22) Filed: May 14, 2003

(65) Prior Publication Data

US 2004/0022150 A1 Feb. 5, 2004

(30) Foreign Application Priority Data

May 30, 2002 (KR) .................... 10-2002-0030299

(51) Int. Cl.
*G11B 7/24* (2006.01)

(52) U.S. Cl. .................... 369/275.3; 369/53.3

(58) Field of Classification Search ............ 369/275.2, 369/275.3, 275.4, 30.25, 30.27, 47.28, 47.39, 369/47.49, 53.2, 53.31, 59.17; 386/96, 111, 386/116
See application file for complete search history.

(56) References Cited

U.S. PATENT DOCUMENTS

| | | | | |
|---|---|---|---|---|
| 5,351,226 A | * | 9/1994 | Mizumoto et al. | 369/47.39 |
| 5,561,644 A | | 10/1996 | Kondo | 369/47.4 |
| 5,592,450 A | * | 1/1997 | Yonemitsu et al. | 386/96 |
| 5,923,640 A | * | 7/1999 | Takemura et al. | 369/275.3 |
| 6,388,959 B1 | | 5/2002 | Kondo | 369/30.19 |
| 6,469,967 B1 | * | 10/2002 | Mau et al. | 369/53.3 |
| 6,496,458 B1 | * | 12/2002 | Tsukihashi | 369/47.47 |
| 6,504,806 B1 | * | 1/2003 | Nakajo | 369/59.12 |
| 6,556,524 B1 | * | 4/2003 | Takeshita | 369/47.43 |
| 6,801,488 B1 | * | 10/2004 | Kato et al. | 369/47.28 |
| 6,894,961 B1 | * | 5/2005 | Osakabe | 369/47.28 |
| 2004/0004921 A1 | * | 1/2004 | Lee et al. | 369/47.39 |
| 2004/0013074 A1 | * | 1/2004 | Lee et al. | 369/94 |
| 2004/0240350 A1 | * | 12/2004 | Tanii et al. | 369/47.43 |

FOREIGN PATENT DOCUMENTS

| | | |
|---|---|---|
| EP | 0 628 964 B1 | 8/1999 |
| JP | 5-12784 | 1/1993 |
| JP | 9-251407 | 9/1997 |

* cited by examiner

*Primary Examiner*—Tan Dinh
(74) *Attorney, Agent, or Firm*—Stein, McEwen & Bui, LLP

(57) ABSTRACT

An optical information storage medium includes information on recording layers having the same reproduction channel characteristics or different reproduction channel characteristics. Nominal recording speed information is recorded in a read-only zone, and maximum and minimum recordable speed information is recorded in a recordable zone of an area other than a user data area. The nominal recording speed information is reproduced using a differential signal channel or a sum channel, and the maximum and the minimum recordable speed information is reproduced using the sum channel. The optical information storage medium addresses a situation where the nominal recording speed is not satisfied due to errors occurring during the manufacture of the storage medium. Thus, the defective disc proportion can be reduced, and loss of user data due to application of inaccurate recording layer information can be prevented.

72 Claims, 3 Drawing Sheets

OPTICAL INFORMATION STORAGE MEDIUM AND RECORDING/REPRODUCING METHOD FOR THE OPTICAL INFORMATION STORAGE MEDIUM

CROSS-REFERENCE TO RELATED APPLICATIONS

This application claims the benefit of Korean Patent Application No. 2002-30299, filed May 30, 2002, in the Korean Intellectual Property Office, the disclosure of which is incorporated herein by reference.

BACKGROUND OF THE INVENTION

1. Field of the Invention

The present invention relates to an optical information storage medium and a recording/reproducing method thereof, and more particularly, to an optical information storage medium on which optical information have the same channel characteristics or different recording speed information is recorded thereon, and a recording/reproducing method for the optical information storage medium.

2. Description of the Related Art

Optical discs or optical information storage media are widely used in optical pickup devices that record/reproduce information in a non-contact manner. Types of optical discs include compact discs (CDs), digital versatile discs (DVDs), and high density DVDs (HD-DVDs). Optical discs which are capable of recording, erasing, and reproducing data include CD-R, CD-RW, DVD-RW, DVD-RAM, and DVD+RW.

With an increase in recording density of such optical discs, the performance of a disc drive is improved. Since recording characteristics of such an optical disc match the recording speed of the disc drive, data can be reliably recorded or reproduced where the disc drive satisfies the recording characteristics of the optical disc. While a conventional disc drive can reliably record data on a low speed disc, it does not satisfy the recording characteristics of a high-speed disc, and thus it may frequently damage user data. On the other hand, a conventional disc drive for a high-speed disc can also damage user data when recording the user data on a low speed disc.

Accordingly, the recording speed information is needed to reliably record data. To obtain such information, a recording speed of a disc is recorded in a predetermined region of the disc, and a disc drive recognizes the recording speed of a desired disc and records data at a predetermined recording speed of the desired disc. For example, in a case of a 2x-speed disc, a recording speed of the disc is recorded in a predetermined region of the disc prior to its shipment, and thus a disc drive can record data referring to recording characteristics according to the recording speed of the disc recorded thereon.

However, quite frequently, a recording speed of a disc does not reach a nominal recording speed of the disc during a testing. For example, after a 4x-speed disc is manufactured and a recording speed thereof is recorded in a predetermined region of the disc, the true recording speed of the disc does not actually reach the 4x speed. At this time, such a disc cannot be used as a 4x-speed disc, but it may be appropriate as a 3x-speed disc or a 2x-speed disc. However, a disc drive will still recognize the disc as the 4x-speed disc because the recorded recording speed is 4x speed, and will try to record user data at the 4x speed. In such a case, since the recording speed does not actually reach the 4x speed, the user data cannot be recorded normally and can be damaged. Consequently, the 4x-speed disc, which may be appropriate as a 3x-speed disc or a 2x-speed disc instead, is discarded as a defective disc.

Accordingly, a method of using such a disc is needed, and a subsequent operation is needed to handle a case where a recording speed of the disc decreases due to various manufacturing conditions of the disc.

SUMMARY OF THE INVENTION

Accordingly, it is an aspect of the present invention to provide an optical information storage medium and a recording and/or reproducing method thereof, in which recording speed information is recorded using different channel characteristics or the same channel characteristics, wherein formal recording speed information, which is reproduced using a differential signal channel or a sum channel, is recorded as read-only data, and recordable speed information that is reproduced using the sum channel is recorded in a re-recordable zone of an area other than a user data area, so as to record user data on the optical information storage medium at an optimal speed without damaging the user data.

Additional aspects and advantages of the invention will be set forth in part in the description which follows and, in part, will be obvious from the description, or may be learned by practice of the invention.

To achieve the above and/or other aspects of the present invention, there is provided an information storage medium comprising a user data area, and a read-only area wherein formal recording speed information, which is reproduced by a differential signal channel, is recorded on the read-only area, and maximum recordable speed information, which is reproduced by a sum channel, is recorded in a recordable zone of an area other than the user data area. The information storage medium may be an optical information storage medium.

The formal recording speed information may be recorded as a high-frequency wobble. The formal recording speed information may be in a pit shape, instead, that is reproduced using the sum channel.

The information storage medium may further comprise a lead-in area and a lead-out area, wherein the maximum recordable speed information is recorded in a re-recordable data zone of at least one of the lead-in area and the lead-out area. The maximum recordable speed information may be redundantly recorded in the re-recordable data zones of the lead-in and lead-out areas.

The re-recordable data zone may comprise a disc control data zone which includes at least one disc control data area in which disc control data is recorded and a reserved area, and the maximum recordable speed information may be recorded in any of the at least one disc control data area and the reserved area.

The maximum recordable speed information may be recorded as a recording layer flag or code using at least one bit or a bit combination of a predetermined byte in the re-recordable data zone.

Minimum recordable speed information of the information storage medium may also be recorded in the re-recordable data zone of at least one of the lead-in and lead-out areas.

To achieve the above and/or other aspects of the present invention there is provided another information storage medium comprising a user data area and a read-only area, wherein formal recording speed information, which is reproduced by a differential signal channel or a sum channel, is recorded on the read-only area, and recordable speed information, which is reproduced by the sum channel, is recorded in a recordable zone of an area other than the user data area.

To achieve the above and/or other aspects of the present invention, there is provided a method of recording and/or reproducing data in/from an information storage medium having a lead-in area, a user data area, and a lead-out area, the method comprising recording formal recording speed information, which is reproduced by a differential signal channel or a sum channel, in a read-only data zone of at least one of the lead-in area and the lead-out area, and recording maximum recordable speed information, which is reproduced by the sum channel, in a re-recordable data zone of at least one of the lead-in area and the lead-out area. The method may further comprise recognizing the maximum recordable speed information using a disc drive and recording the data on the information storage medium.

To achieve the above and/or other aspects of the present invention, there is provided there is provided another method of recording and/or reproducing data in/from an information storage medium having a lead-in area, a user data area, and a lead-out area, the method comprising recording formal recording speed information, which is reproduced by a differential signal channel or a sum channel, in a read-only data zone of at least one of the lead-in area and the lead-out area, and recording recordable speed information, which is reproduced by the sum channel, in a re-recordable data zone of at least one of the lead-in area and the lead-out area. The method may further comprise recognizing the recordable speed information using a disc drive and recording the data on the information storage medium.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE EMBODIMENTS

Figure 1:
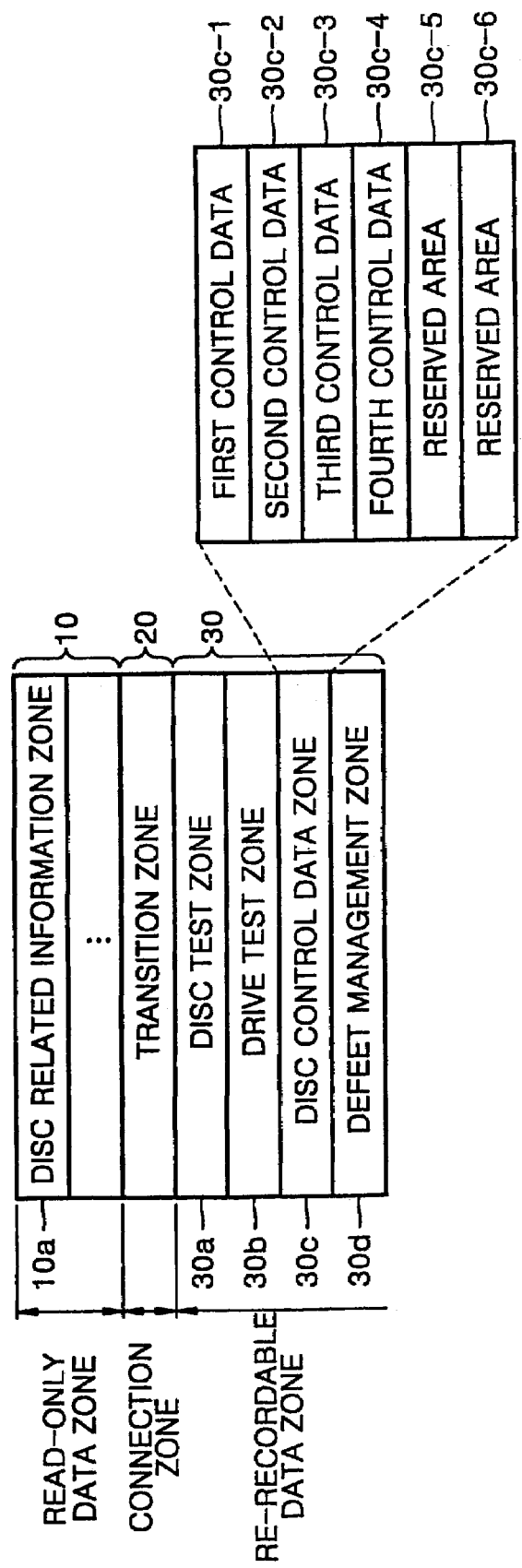
FIG. 1 illustrates the structure of a lead-in area of an optical information storage medium according to the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows the structure of a lead-in area of an optical information storage medium according to the present invention. The optical information storage medium may include the lead-in area, a user data area and a lead-out area. The lead-in area is formed of pits or in a high frequency wobble on the innermost circumference of the optical information storage medium, for example, a disc, and includes a read-only data zone 10, a connection zone 20, and a re-recordable data zone 30. The read-only data zone 10 contains the basic information on the disk.

The read-only data zone 10 includes a disc information zone 10a having a formal recording speed of the disc recorded therein. The formal recording speed of the disc denotes a recording speed determined during the design of the disc or in a format that describes the disc. For example, formal recording speed information, which is read-only data, can be recorded in a land pre-pit (LPP) or a pit, or recorded as a high-frequency wobble signal. In this respect, a high-frequency wobble signal refers to a wobble signal that has a relatively higher frequency than a wobble signal formed in a user data area. The formal recording speed information recorded in a high-frequency wobble is reproduced using a differential signal channel (ch2) that uses a push-pull signal. The formal recording speed information recorded in a pit is reproduced using a sum channel (ch1). Upon data recording on a disc, the formal recording speed for the disc recorded as described above is recognized by a disc drive so as to record the user data at an optimal recording speed.

The size of the disc, a version number, recording conditions, or the like may also be recorded in the disc information zone 10a.

The connection zone 20 may include a transition zone that connects the read-only data zone 10 to the re-recordable data zone 30. The connection zone 20 can be a mirror zone or can be a wobble groove area.

The re-recordable data zone 30 may include a disc test zone 30a, a drive test zone 30b, a disc control data zone 30c, and a defect management zone 30d. The disc control data zone 30c includes at least one disc control area in which information regarding a disc control is recorded. For example, first through fourth disc control areas 30c-1, 30c-2, 30c-3, and 30c-4 are included in the disc control data zone 30c. At least one reserved area, for example, two reserved areas 30c-5 and 30c-6, can be further included to record other information.

Since the lead-out area has a similar structure to the lead-in area, the lead-out area will not be described in detail.

An optical information storage medium should be able to record data according to the formal recording speed information recorded in the disc-related information zone 10a. However, in practice, due to errors occurring during the manufacture of the optical information storage medium, the formal recording speed does not satisfy the predetermined recording characteristics in accordance with the formal recording speed information. Hence, the data is recorded at a speed that is, for example, lower than the formal recording speed. In this case, instead of the formal recording speed, effective recording speed information that is recordable and actually satisfies predetermined recording characteristics needs to be newly recorded.

In a recording/reproducing method for an optical information storage medium according to a first embodiment of the present invention, a maximum recordable speed is recorded in a recordable zone of the areas other than the user data area. For example, the maximum recordable speed information can be recorded in a predetermined area of the re-recordable data zone 30. Meanwhile, the maximum recordable speed information, which is data reproduced using the sum channel (ch1), can be recorded in the same manner as data is recorded in the user data area.

Figure 2:
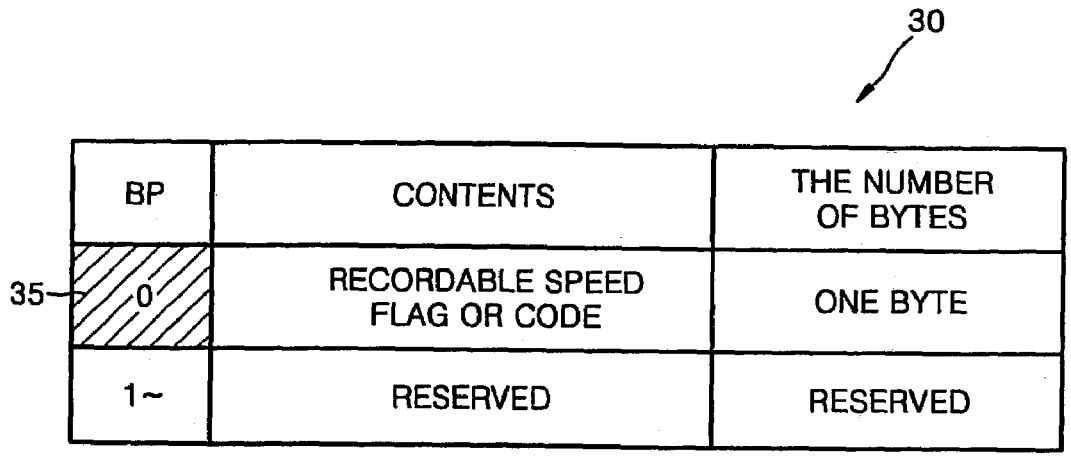
FIG. 2 illustrates a part of a data structure of an optical information storage medium according to the present invention.

For example, FIG. 2 shows a predetermined area of the re-recordable data zone 30 having a plurality of bytes. As shown in FIG. 2, the predetermined area can store the maximum recordable speed information in one byte among the plurality of bytes. That is, the re-recordable data zone 30 stores a recordable speed flag or a recordable speed code using at least one bit existing at a zero byte position (BP) 35 in the predetermined area or using a bit combination of a predetermined byte, respectively. Although the maximum recordable speed is recorded at the zero BP 35 in FIG. 2, it may be recorded at a desired BP other than a zero BP. The maximum recordable speed information may also be recorded using a plurality of bytes instead of one byte.

Figure 3A:
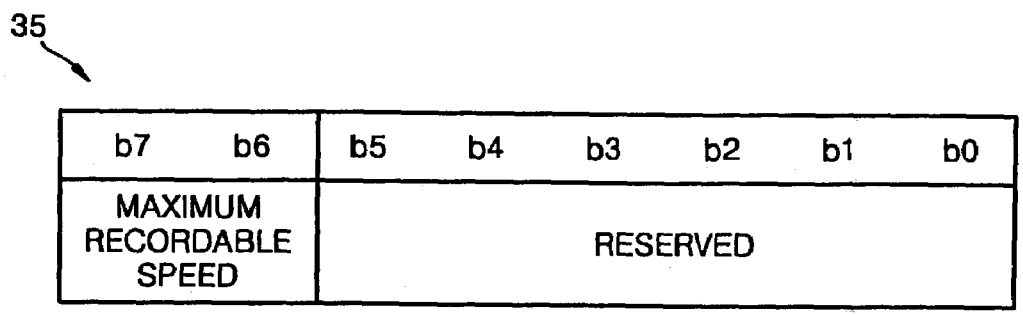
FIG. 3A is a schematic view illustrating an optical information storage medium according to an embodiment of the present invention.

FIG. 3 shows the internal structure of the zero BP 35 for an optical information storage medium according to the first embodiment. The zero BP 35 comprises 8 bits, that is, zero through seventh bits (bits b0 through b7). For example, the recordable speed flag or a code using the bit combination of a predetermined byte can be recorded using the seventh and the sixth bits b7 and b6. The other bits are reserved.

For example, where a formal recording speed is 5×, the seventh and the sixth bits are recorded as 00b, a fact which indicates that the data can be recorded in accordance with the formal recording speed. That is, the data can be recorded at the maximum recordable speed of 5×. Where the seventh and the sixth bits are recorded as 01b, the data can be recorded at the maximum recordable speed of 2× and cannot be recorded at a speed that is higher than 2×. Where the seventh and the sixth bits are recorded as 10*b*, the data can be recorded at the maximum recordable speed of 3×. Where the seventh and the sixth bits are recorded as 11*b*, the data can be recorded at the maximum recordable speed of 4×.

Where a formal recording speed is 3×, and the seventh and sixth bits are recorded as 00b, the data can be recorded in accordance with the formal recording speed of 3×. Where the seventh and the sixth bits are recorded as 01b, the data can be recorded at the maximum recordable speed of 2× and cannot be recorded at a speed that is higher than 2×.

To apply the internal structure of the zero BP 35 to a disc designed to have a recording speed of over 6×, three bits can be used to record the data. For example, where a formal recording speed is more than 6×, 000b indicates that the data can be recorded at the maximum recordable speed of 6× and cannot be recorded at a recording speed higher than 6×. Similarly, 001b indicates that the data can be recorded at the maximum recordable speed of 2×, 010b indicates that the data can be recorded at the maximum recordable speed of 3×. Where the maximum recordable speed is recorded as 00b or 000b, the data can be recorded at the formal recording speed.

In the above embodiment, the maximum recordable speed is recorded using 2 or 4 bits. However, the maximum recordable speed can be recorded using 4 through 8 bits. In other words, recordable effective recording layer information can be recorded using at least one bit or a bit combination of a byte in a re-recordable area. However, a plurality of bytes instead of one byte can also be used.

As described above, the maximum recordable speed is recorded in a predetermined area of a re-recordable data zone of at least one of a lead-in area and a lead-out area. Accordingly, a disc drive records data at an optimal recording speed in accordance with the maximum recordable speed.

Referring to FIG. 1, the maximum recordable speed information can be recorded in at least one of the disc control data areas 30*c*-1, 30*c*-2, 30*c*-3, and 30*c*-4 of the disc control data zone 30*c*. Alternatively, the maximum recordable speed information can be recorded in the reserved areas 30*c*-5 and 30*c*-6. In the above, a case where the maximum recordable speed is recorded in the re-recordable data zone of a lead-in area has been described. However, the maximum recordable speed information can be recorded in a re-recordable data zone of a lead-out area that is provided on a side of an outer circumference of a disc.

To increase the reliability, the maximum recordable speed information can be redundantly recorded in both the recordable data zones of the lead-in and lead-out areas.

An optical information recording medium according to the first embodiment of the present invention has been shown to store maximum recordable information in a predetermined area of a re-recordable data zone of at least one of lead-in and lead-out areas. While the maximum recordable speed information can be recorded as a speed flag or code using at least one bit or a bit combination of a predetermined byte, a plurality of bytes can be used to record the maximum recordable speed information. Additionally, although the maximum recordable speed is recorded in a zero BP as described above, the maximum recordable speed information can also be recorded in a BP other than the zero BP.

In a recording/reproducing method for an optical information recording medium according to a second embodiment of the present invention, the maximum recordable speed is recorded in all of the bits that constitute a recordable zone of areas other than a user data area. For example, the maximum speed information can be recorded in a predetermined area of the re-recordable data zone 30. Here, the re-recordable data zone 30 is also included in a lead-out area.

Figure 3B:
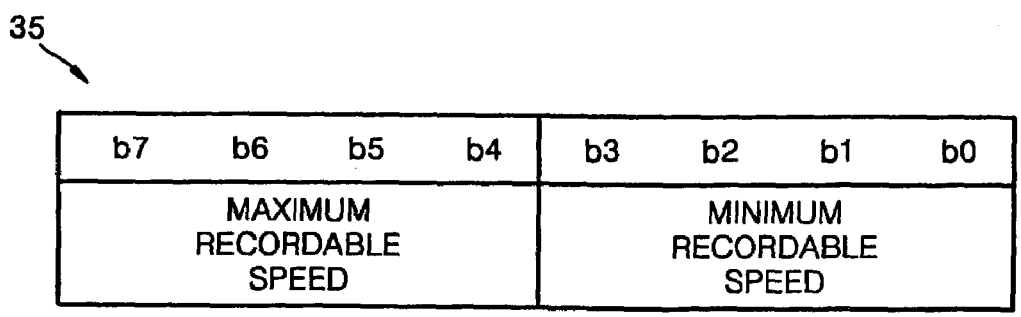
FIG. 3B is a schematic view illustrating an optical information storage medium according to another embodiment of the present invention.

That is, maximum and minimum recordable speed information can be recorded in a predetermined area, for example, either the disc control data areas 30*c*-1, 30*c*-2, 30*c*-3, and 30*c*-4 or the reserved areas 30*c*-5 and 30*c*-6, in the re-recordable data zone 30. As shown in FIG. 3B, either the disc control data areas 30*c*-1, 30*c*-2, 30*c*-3 and 30*c*-4, or the reserved areas 30*c*-5 and 30*c*-6 comprise a plurality of bytes. The maximum and minimum recordable speed information is recorded using, for example, all of the 8 bits that constitute each byte. Here, the maximum and minimum recordable speed information, which is data reproduced using the sum channel (ch1), can be recorded in the same manner as data is recorded in the user data area.

To increase the reliability, the maximum and minimum recordable speed information can be redundantly recorded in both the recordable data zones of the lead-in and lead-out area.

By way of an example, the following shows a case where the formal recording speed of a disc is 8×, while a determination through a testing of recording characteristics shows that the disc records data at 5–7×. In this case, the maximum recordable speed is 7×, and the minimum recordable speed is 5×. Referring to FIG. 3B, the maximum recordable speed is recorded in seven through four bits b7, b6, b5, and b4, and the minimum recordable speed is recorded in three through zero bits b3, b2, b1, and b0. As described above, the maximum or minimum recordable speed can be recorded using 4 bits, as shown in the following table.

TABLE 1

| Bit | Recording speed |
|---|---|
| 0000b | 2× |
| 0001b | 3× |
| 0010b | 4× |
| 0011b | 5× |
| 0100b | 6× |
| 0101b | 7× |
| 0110b | 8× |
| 0111b | 9× |

Referring to Table 1, the recording speed 5×–7× can be presented as 01010011b. Here, the maximum recordable speed and the minimum recordable speed are presented using a combination of four bits. However, the maximum recordable speed and the minimum recordable speed can be presented using a combination of two or three bits.

In a recording/reproducing method for an optical information recording medium according to the second embodiment of the present invention, a maximum and a minimum recordable speed are recorded in all of the bits that constitute a recordable zone of areas other than a user data area. The maximum and minimum recordable speed information can be recorded using a combination of two through four bits, and the maximum and minimum recordable speed information can be recorded in different BPs.

Figure 4:
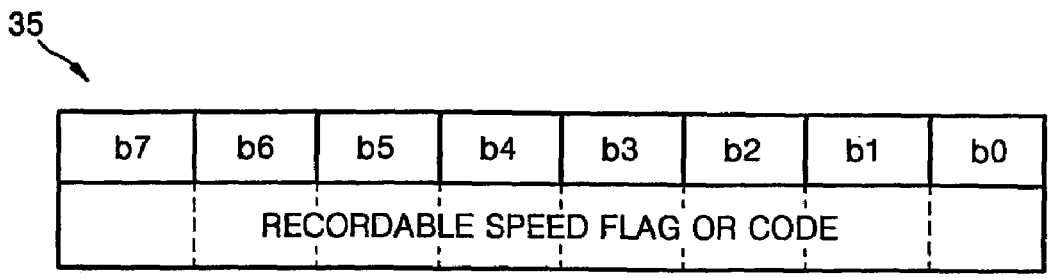
FIG. 4 is a schematic view illustrating an optical information storage medium according to yet another embodiment of the present invention.

An optical information storage medium according to a third embodiment of the present invention and a recording/reproducing method thereof will now be described with reference to FIGS. 1 and 4.

In this embodiment, a recordable speed is recorded in a predetermined area of a re-recordable area of at least one of lead-in and lead-out areas by using each bit.

For example, recordable speed information can be recorded in the disc control data area 30c-1, 30c-2, 30c-3, 30c-5 or the reserved area 30c-5, 30c-6, using a bit or a combination of bits in a predetermined area of the re-recordable data zone 30 shown in FIG. 1. The disc control data area 30c-1, 30c-2, 30c-3, 30c-5 and the reserved area 30c-5, 30c-6 comprise a plurality of bytes, and the recordable speed is recorded by using, for example, 8 bits of one byte of the plurality of bytes.

That is, each bit of a BP corresponds to different recordable speeds, and corresponding recordable speed information is recorded by using each bit. For example, each bit and the corresponding recordable speeds are as follows.

TABLE 2

| BP | Recordable speed |
|---|---|
| 7b | 2× |
| 6b | 3× |
| 5b | 4× |
| 4b | 5× |
| 3b | 6× |
| 2b | 7× |
| 1b | 8× |
| 0b | 9× |

Referring to FIG. 2, all recordable speeds can be presented by recording the recordable speed information in a corresponding bit position. That is, where 0b is recorded in the seventh bit 7b, the data can be recorded at 9×. Where 1b is recorded in the seventh bit 7b, the data cannot be recorded at 9×. Where 0b is recorded in the sixth bit 6b, the data can be recorded at 3×. Where 1b is recorded in the sixth bit 6b, the data cannot be recorded at 3×. The same applies to the fifth through 0-th bits 5b, 4b, 3b, 2b, 1b, and 0b, so as to record the recordable speed information in a corresponding bit position.

In the third embodiment, where the formal recording speed is 9× and the disc satisfies the predetermined recording characteristics of a 5×–7× disc, the recordable speed can be recorded as 111110001b with reference to Table 2.

To increase the reliability, the recordable speed can be redundantly recorded in both the recordable data zones of the lead-in and lead-out areas.

Information on a recording possibility for a particular speed can also be recorded as follows.

TABLE 3

| BP | Recordable speed |
|---|---|
| 7b | Speed 1 |
| 6b | Speed 2 |
| 5b | Speed 3 |
| 4b | Speed 4 |
| 3b | Speed 5 |
| 2b | Speed 6 |
| 1b | Speed 7 |
| 0b | Speed 8 |

For example, where speed 1 in table 3 is 3 m/s, speed 2 is 5 m/s, speed 3 is 7 m/s, the seventh bit 7b, the sixth bit 6b, and the fifth bit 5b are 0b, 1b, 1b, respectively, a recording can be performed only at a speed 3 m/s. Where the bits are 0b, 0b, 1b, respectively, both recording speeds of 3 m/s and 5 m/s are possible. Here, a recordable speed may be a real number as well as a natural number.

Figure 5:
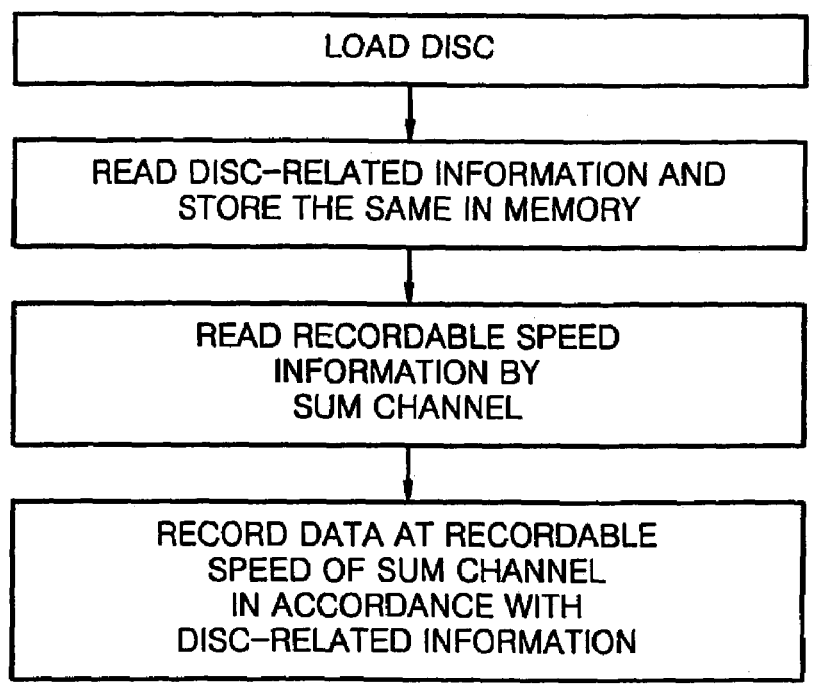
FIG. 5 is a block diagram illustrating a method of determining a recording speed of an optical information storage medium according to the present invention.

FIG. 5 shows a block diagram illustrating a method of determining a recording speed of an optical information storage medium and recording data thereon according to the present invention. To record information on a disc, first, the disc is loaded in a disc drive, and a formal recording speed, which is a piece of disc-related information, is read as a sum channel (ch1) or a differential signal channel (ch2), which uses a push-pull signal, from a predetermined area of the disc and stored in a memory. Next, recordable speed information is reproduced by, for example, the sum channel (ch1) from at least one area of lead-in and lead-out areas. Finally, the data is recorded in accordance with the recordable speed information reproduced by the sum channel. Recording conditions related to particular recording speed prescribed on the disc, as shown in table 3, are provided where disc-related information corresponding to the recording conditions is read.

In the second and third embodiments described above, since all recordable speeds can be mentioned, more accurate and concrete recordable speed information can be provided. In particular, as the recording speed of the disc becomes higher, the disc drive designed for the disc having a low recording speed may not be compatible with the disc having the high recording speed. On the other hand, the disc drive designed for a disc having a speed that is higher than 5× may not normally record data on the disc having the recording characteristics according to a recording speed that is slower than 5×. However, a disc drive can easily manage an optical disk of the present invention since information on all recordable speeds is recorded thereon.

Moreover, where version-related information in accordance with disc standards is recorded with the recording speed information in the disc-related information zone 10a, a disc drive can also easily manage disc version-related problems. Data is recorded or reproduced by a disc drive corresponding to a version recorded in the disc-related information zone 10a. However, where a version is updated, the disc drive may have difficulties in reading the updated disc version. Thus, the disc drive cannot record or reproduce the data due to errors occurring in connection with the updated disc version, although the disc drive satisfies the recording characteristics of the disc.

For example, where a recording speed is 1× through 3× for a 1.0 disc version, and the recording speed is 2× through 5× for a 2.0 disc version, a disc drive for 1.0 version cannot normally record or reproduce data to or from a 2.0 disc version. However, considering only the recording characteristics of the disc drive, the disc drive for the 1.0 disc version may record data at 2× or 3×. In this case, according to the present invention, the data can be recorded by using a recordable speed recorded in a re-recordable area, though the disc version is changed. That is, where the disc drive satisfies record characteristics using recordable speed information that is reproduced by the sum channel (ch1), the disc drive records data irrespective of the version of the disc.

The first through third embodiments of the present invention can be applied to a multi-layered optical information storage medium. A speed flag or code that represents such recordable speed information may be recorded only by a disc manufacturer and protected from being changed or erased by a disc drive after a disc is marketed.

As described above, an optical information storage medium according to the present invention and a recording/reproducing method thereof can cope with a situation where all of the recording layers do not satisfy formal recording speed information due to errors during the manufacture of the optical information storage medium. In particular, with a recent trend toward a higher recording capacity, there is an increasing need for an optical information storage medium and a method thereof according to the present invention.

In an optical information storage medium according to the present invention and a recording/reproducing method thereof, a defective disc proportion can be reduced, and loss of user data due to an application of inaccurate recording layer information can be prevented.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An information storage medium comprising:
a user data area; and
a read-only area,
wherein formal recording speed information, which is reproduced by a differential signal channel, is recorded on the read-only area, and maximum recordable speed information, which is reproduced by a sum channel, is recorded in a recordable zone of an area other than the user data area, and
wherein the formal recording speed information indicates a recording speed suggested by a manufacturer for recording data on the information storage medium, and the maximum recordable speed information indicates an effective maximum recording speed obtained, via actual testing of predetermined recording characteristics of the information storage medium.

2. The information storage medium of claim 1, wherein the formal recording speed information is recorded as a high-frequency wobble signal.

3. The information storage medium of claim 2, further comprising:
a lead-in area; and
a lead-out area, wherein the maximum recordable speed information is recorded in a re-recordable data zone of at least one of the lead-in area and the lead-out area.

4. The information storage medium of claim 3, wherein the maximum recordable speed information is redundantly recorded in the re-recordable data zones of the lead-in and lead-out areas.

5. The information storage medium of claim 4, wherein:
each of the re-recordable data zones comprises:
a disc control data zone which includes at least one disc control data area in which disc control data is recorded; and
a reserved area, and
the maximum recordable speed information is recorded in any of the at least one disc control data area and the reserved area.

6. The information storage medium of claim 3, wherein the maximum recordable speed information is recorded as a recording layer flag or code using at least one bit or a bit combination of a predetermined byte in the re-recordable data zone.

7. The information storage medium of claim 3, wherein minimum recordable speed information of the information storage medium is recorded in the re-recordable data zone of at least one of the lead-in and lead-out areas.

8. The information storage medium of claim 7, wherein:
the re-recordable data zone comprises:
a disc control data zone which includes at least one disc control data area in which disc control data is recorded; and
a reserved area, and
the minimum recordable speed information is recorded in any of the at least one disc control data area and the reserved area.

9. An information storage medium comprising:
a user data area;
a read-only area,
wherein formal recording speed information, which is in a pit shape that is reproduced using a sum channel, is recorded on the read-only area, and maximum recordable speed information, which is reproduced by the sum channel, is recorded in a recordable zone of an area other than the user data area, and
wherein the formal recording speed information indicates a recording speed suggested by a manufacturer for recording data on the information storage medium, and the maximum recordable speed information indicates an effective maximum recording speed obtained, via actual testing of predetermined recording characteristics of the information storage medium.

10. The information storage medium of claim 9, further comprising:
a lead-in area; and
a lead-out area, wherein the maximum recordable speed information is recorded in a re-recordable data zone of at least one of the lead-in area and the lead-out area.

11. The information storage medium of claim 10, wherein the maximum recordable speed information is redundantly recorded in the re-recordable data zones of the lead-in and lead-out areas.

12. The information storage medium of claim 11, wherein:
   each of the re-recordable data zones comprises:
      a disc control data zone which includes at least one disc control data area in which disc control data is recorded; and
      a reserved area, and
   the maximum recordable speed information is recorded in any of the at least one disc control data area and the reserved area.

13. The information storage medium of claim 10, wherein the maximum recordable speed information is recorded as a recording layer flag or code using at least one bit or a bit combination of a predetermined byte in the re-recordable data zone.

14. The information storage medium of claim 10, wherein minimum recordable speed information of the information storage medium is recorded in the re-recordable data zone of at least one of the lead-in and lead-out areas.

15. The information storage medium of claim 14, wherein:
   the re-recordable data zone comprises:
      a disc control data zone which includes at least one disc control data area in which disc control data is recorded; and
      a reserved area, and
   the minimum recordable speed information is recorded in any of the at least one disc control data area and the reserved area.

16. The information storage medium of claim 14, wherein the maximum recordable speed information and the minimum recordable speed information are recorded as a recording layer flag or code using at least one bit or a bit combination of a predetermined byte in the re-recordable data zone.

17. The information storage medium of claim 14, wherein the maximum recordable speed information and the minimum recordable speed information are redundantly recorded in the re-recordable data zones of the lead-in and lead-out areas.

18. An information storage medium comprising:
   a user data area; and
   a read-only area,
   wherein formal recording speed information, which is reproduced by a differential signal channel, is recorded on the read-only area, and recordable speed information, which is reproduced by a sum channel, is recorded in a recordable zone of an area other than the user data area, and
   wherein the formal recording speed information indicates a recording speed suggested by a manufacturer for recording data on the information storage medium, and the recordable speed information indicates an effective recording speed obtained, via actual testing of predetermined recording characteristics of the information storage medium.

19. The information storage medium of claim 18, wherein the formal recording speed information is recorded as a high-frequency wobble signal.

20. The information storage medium of claim 19, further comprising:
   a lead-in area; and
   a lead-out area, wherein the recordable speed information is recorded in a re-recordable data zone of at least one of the lead-in area and the lead-out area.

21. The information storage medium of claim 20, wherein the recordable speed information corresponding to each bit of a predetermined byte of the re-recordable data zone is recorded using each bit or a combination of bits.

22. The information storage medium of claim 20, wherein:
   the re-recordable data zone comprises:
      a disc control data zone which includes at least one disc control data area in which disc control data is recorded; and
      a reserved area, and
   the recordable speed information is recorded in any of the at least one disc control data area and the reserved area.

23. The information storage medium of claim 20, wherein the recordable speed information is redundantly recorded in the re-recordable data zones of the lead-in and lead-out areas.

24. The information storage medium of claim 18, further comprising:
   a lead-in area; and
   a lead-out area are included, wherein the recordable speed information is recorded in a re-recordable data zone of at least one of the lead-in area and the lead-out area.

25. An information storage medium comprising:
   a user data area; and
   a read-only area,
   wherein formal recording speed information, which is in a pit shape that is reproduced using a sum channel, is recorded on the read-only area, and recordable speed information, which is reproduced by the sum channel, is recorded in a recordable area other than the user data area, and
   wherein the formal recording speed information indicates a recording speed suggested by a manufacturer for recording data on the information storage medium, and the recordable speed information indicates an effective recording speed obtained, via actual testing of predetermined recording characteristics of the information storage medium.

26. The information storage medium of claim 25, wherein the information storage medium is an optical information storage medium including a plurality of recording layers.

27. The information storage medium of claim 25, further comprising:
   a lead-in area; and
   a lead-out area, wherein the recordable speed information is recorded in a re-recordable data zone of at least one of the lead-in area and the lead-out area.

28. The information storage medium of claim 27, wherein the recordable speed information corresponding to each bit of a predetermined byte of the re-recordable data zone is recorded using each bit or a combination of bits.

29. The information storage medium of claim 27, wherein:
   the re-recordable data zone comprises:
      a disc control data zone which includes at least one disc control data area in which disc control data is recorded; and
      a reserved area, and
   the recordable speed information is recorded in any of the at least one disc control data area and the reserved area.

30. A method of recording and/or reproducing data on/from an information storage medium having a lead-in area, a user data area, and a lead-out area, the method comprising:
   recording formal recording speed information in a read-only data zone of at least one of the lead-in area and the lead-out area; and recording maximum recordable speed information in a re-recordable data zone of at least one of the lead-in area and the lead-out area, wherein the formal recording speed information indicates a recording speed suggested by a manufacturer for recording data on the information storage medium, and the maximum recordable speed information indicates an effective maximum recording speed obtained, via actual testing of predetermined recording characteristics of the information storage medium.

31. The method of claim 30, wherein the recording of the formal recording speed information comprises recording the formal recording speed information as a high-frequency wobble or a pit.

32. The method of claim 31, wherein the recording of the maximum recordable speed information comprises redundantly recording the maximum recordable speed information in the re-recordable data zones of the lead-in and lead-out areas.

33. The method of claim 32, wherein:
each of the re-recordable data zones comprises:
a disc control data zone which includes at least one disc control data area in which disc control data is recorded; and
a reserved area, and
the recording of the maximum recordable speed information comprises recording the maximum recordable speed information in any of the at least one disc control data area and the reserved area.

34. The method of claim 30, wherein the recording of the maximum recordable speed information comprises recording the maximum recordable speed information as a recording layer flag or code using at least one bit or a bit combination of a predetermined byte in the re-recordable data zone.

35. The method of claim 30, further comprising recording minimum recordable speed information in the re-recordable data zone of at least one of the lead-in and lead-out areas.

36. The method of claim 35, wherein the recording of the maximum recordable speed information and the recording of the minimum recordable speed information comprise redundantly recording the maximum and minimum recordable speed information in the re-recordable data zones of the lead-in and lead-out areas.

37. The method of claim 36, wherein:
each of the re-recordable data zones comprises:
a disc control data zone which includes at least one disc control data area in which disc control data is recorded; and
a reserved area, and
the recording of the maximum recordable speed information and the minimum recordable speed information comprises recording the maximum and minimum recordable speed information in any of the at least one disc control data area and the reserved area.

38. The method of claim 35, wherein the recording of the maximum recordable speed information and recording of the minimum recordable speed information comprise recording the maximum and minimum recordable speed information as a recording layer flag or code using at least one bit or a bit combination of a predetermined byte in the re-recordable data zone.

39. The method of claim 35, further comprising recording the data on the optical information storage medium using the maximum recordable speed information and the minimum recordable speed information irrespective of a version of the information storage medium.

40. A method of recording and/or reproducing data on/from an information storage medium having a lead-in area, a user data area, and a lead-out area, the method comprising:
recording formal recording speed information in a read-only data zone of at least one of the lead-in area and the lead-out area; and
recording recordable speed information in a re-recordable data zone of at least one of the lead-in area and the lead-out area,
wherein the formal recording speed information indicates a recording speed suggested by a manufacturer for recording data on the information storage medium, and the recordable speed information indicates an effective recording speed obtained, via actual testing of predetermined recording characteristics of the information storage medium.

41. The method of claim 40, wherein the recording of the formal recording speed information comprises recording the formal recording speed information as a high-frequency wobble or a pit.

42. The method of claim 40, further comprises recording the recordable speed information as a recording layer flag or code using at least one bit or a bit combination of a predetermined byte in the re-recordable data zone.

43. The method of claim 41, further comprising recording minimum recordable speed information in the re-recordable data zone of at least one of the lead-in and lead-out areas.

44. The method of claim 43, wherein:
the re-recordable data zone comprises:
a disc control data zone which includes at least one disc control data area in which disc control data is recorded; and
a reserved area, and
the recording of the recordable speed information comprises recording the recordable speed information in any of the at least one disc control data area and the reserved area.

45. The method of claim 41, wherein:
the re-recordable data zone comprises:
a disc control data zone which includes at least one disc control data area in which disc control data is recorded; and
a reserved area, and
the recording of the recordable speed information comprises recording the recordable speed information in any of the at least one disc control data area and the reserved area.

46. The method of claim 40, further comprising recording the data on the optical information storage medium using the recordable speed information irrespective of a version of the information storage medium.

47. The method of claim 40, wherein the information storage medium includes a plurality of recording layers.

48. The information storage medium of claim 1, wherein the information storage medium is an optical information storage medium.

49. The information storage medium of claim 3, wherein the lead-in area includes the read-only area.

50. The information storage medium of claim 3, wherein the maximum recordable speed information is recorded as a recording layer flag or code using a plurality of bytes.

51. The information storage medium of claim 7, wherein the minimum recordable speed information is redundantly recorded in the re-recordable data zones of the lead-in and lead-out areas.

52. The information storage medium of claim 18, wherein the information storage medium is an optical information storage medium.

53. The information storage medium of claim 18, wherein the recordable speed information includes all recordable speeds of the information storage medium.

54. The information storage medium of claim 18, wherein the formal recording speed information includes version-related information of the information storage medium.

55. The information storage medium of claim 21, wherein each bit of the recordable speed information corresponds to different recordable speeds.

56. The information storage medium of claim 21, wherein recordable speeds of the information storage medium are presented by recording the recordable speed information in a corresponding bit position.

57. The method of claim 30, further comprising recognizing the maximum recordable speed information using a disc drive and recording the data on the information storage medium.

58. The method of claim 40, further comprising recognizing the recordable speed information using a disc drive and recording the data on the information storage medium.

59. A method of recording and/or reproducing data with respect to an information storage medium having a lead-in area, a user data area, and a lead-out area, the method comprising:
obtaining designed recording information from a read-only data zone of at least one of the lead-in and lead-out areas;
obtaining recordable speed information from a re-recordable data zone of at least one of the lead-in and lead-out areas; and
recording data at a recordable speed of the recordable speed information in accordance with the formal recording information,
wherein the designed recording information indicates a recording speed designed by a manufacturer for recording data on the information storage medium, and the recordable speed information indicates an effective recording speed obtained, via actual testing of predetermined recording characteristics of the information storage medium.

60. The method of claim 59, wherein:
the obtaining of the designed recording information comprises reading the designed recording information using one of sum channel and differential signal methods, and
the obtaining of the recordable speed information comprises reading the recordable speed information using the sum channel method.

61. An information storage medium comprising:
a user data area; and
a read-only area,
wherein designed recording speed information of the information storage medium is recorded on the read-only area and recordable speed information of the information storage medium is recorded in a readable zone of an area other than the user data area, and
wherein the designed recording speed information indicates a recording speed designed by a manufacturer for recording data on the information storage medium, and the recordable speed information indicates an effective recording speed obtained, via actual testing of predetermined recording characteristics of the information storage medium.

62. The information storage medium of claim 61, further comprising:
a lead-in area; and
a lead-out area, wherein the recordable speed information is recorded in a re-recordable data zone of at least one of the lead-in area and the lead-out area.

63. The information storage medium of claim 62, wherein the recordable speed information corresponding to each bit of a predetermined byte of the re-recordable data zone is recorded using each bit or a combination of bits.

64. The information storage medium of claim 62, wherein the recordable speed information includes maximum recordable speed information which is recorded as a recording layer or code using at least one bit or a bit combination of a predetermined byte in the re-recordable data zone.

65. The information storage medium of claim 64, wherein the recordable speed information further includes minimum recordable speed information.

66. The information storage medium of claim 61, wherein the information storage medium include a plurality of recording layers, and the recordable speed information is recorded in the re-recordable data zone so as to prevent an error in response to all of the recording layers not satisfying the designed recording speed information.

67. An information storage medium comprising:
one or more recording layers;
a user data area; and
a read-only area,
wherein designed recording speed information and recordable speed information on one or more recording layers of the information storage medium are recorded so as to have the same reproduction channel characteristics or different reproduction channel characteristics, and
wherein the designed recording speed information indicates a recording speed designed by a manufacturer for recording data on the information storage medium, and the recordable speed information indicates an effective recording speed obtained, via actual testing of predetermined recording characteristics of the information storage medium.

68. The information storage medium of claim 67, wherein:
the designed recording speed information is recorded on the read-only area, and
the recordable speed information is recorded in a readable zone of an area other than the user data area.

69. The information storage medium of claim 68, further comprising:
a lead-in area; and
a lead-out area, wherein the recordable speed information is recorded in a re-recordable data zone of at least one of the lead-in area and the lead-out area.

70. The information storage medium of claim 69, wherein the recordable speed information is recorded in the re-recordable data zone so as to prevent an error in response to all of the recording layers not satisfying the designed recording speed information.

71. The information storage medium of claim 67, wherein:
the designed recording speed information is reproduced using one of sum channel and differential signal channel methods, and
the recordable speed information is reproduced using the sum channel method.

72. The information storage medium of claim 67, wherein the information storage medium is an optical information storage medium.

* * * * *

UNITED STATES PATENT AND TRADEMARK OFFICE
CERTIFICATE OF CORRECTION

PATENT NO.        : 7,113,475 B2                                           Page 1 of 1
APPLICATION NO.   : 10/437444
DATED             : September 26, 2006
INVENTOR(S)       : Kyung-geun Lee et al.

It is certified that error appears in the above-identified patent and that said Letters Patent is hereby corrected as shown below:

On The Title Page: Item
(30) Foreign Application Priority Date, change "10-2002-0030299" to -- 2002-30299 --

Signed and Sealed this

Thirteenth Day of February, 2007

JON W. DUDAS
*Director of the United States Patent and Trademark Office*